(12) United States Patent
Kirita et al.

(10) Patent No.: US 10,866,309 B2
(45) Date of Patent: Dec. 15, 2020

(54) RADAR SIGNAL PROCESSING DEVICE

(71) Applicant: Mitsubishi Electric Corporation, Tokyo (JP)

(72) Inventors: Mitsuru Kirita, Tokyo (JP); Hiroshi Sakamaki, Tokyo (JP)

(73) Assignee: Mitsubishi Electric Corportaion, Tokyo (JP)

( * ) Notice: Subject to any disclaimer, the term of this patent is extended or adjusted under 35 U.S.C. 154(b) by 238 days.

(21) Appl. No.: 15/964,350

(22) Filed: Apr. 27, 2018

(65) Prior Publication Data

US 2019/0250248 A1 Aug. 15, 2019

(30) Foreign Application Priority Data

Feb. 15, 2018 (JP) ................................ 2018-024717

(51) Int. Cl.
*G01S 7/41* (2006.01)
*G01S 13/931* (2020.01)

(52) U.S. Cl.
CPC .............. *G01S 7/412* (2013.01); *G01S 7/415* (2013.01); *G01S 13/931* (2013.01)

(58) Field of Classification Search
CPC ......... G01S 7/412; G01S 7/415; G01S 13/931
USPC ........................................................ 324/195
See application file for complete search history.

(56) References Cited

U.S. PATENT DOCUMENTS

| 5,574,463 A | * | 11/1996 | Shirai | ................... G01S 7/4802 342/70 |
| 6,249,243 B1 | * | 6/2001 | Takagi | .................... G01S 7/352 342/108 |
| 6,377,205 B1 | * | 4/2002 | Eckersten | ............ G01S 13/931 342/90 |

(Continued)

FOREIGN PATENT DOCUMENTS

| JP | 2011-65400 A | | 3/2011 |
| JP | 2011065400 A | * | 3/2011 |

(Continued)

OTHER PUBLICATIONS

Communication dated Feb. 19, 2019, from the Japanese Patent Office in counterpart application No. 2018-024717.

*Primary Examiner* — Peter M Bythrow
*Assistant Examiner* — Alexander L. Syrkin
(74) *Attorney, Agent, or Firm* — Sughrue Mion, PLLC; RIchard C. Turner (57) ABSTRACT

A radar signal processing device capable of performing a highly accurate object identification is obtained. A first feature quantity related to a relative distance and a relative speed to an object, the direction and the reflection intensity of the object, which are extracted by a first feature quantity extraction block, is made identical in time series in a data storage processing block; a second feature quantity is extracted by a second feature quantity extraction block; one in which an instant score is accumulated in a cycle direction to the distribution of the second feature quantity related to a predetermined category calculated by an attribution degree (Continued)

calculation block is calculated as an accumulation score by an accumulation/instant score calculation block; and a category of the object is determined by an object determination block on the basis of the accumulation score calculated by the accumulation/instant score calculation block.

5 Claims, 10 Drawing Sheets

(56) References Cited

U.S. PATENT DOCUMENTS

| | | | | |
|---|---|---|---|---|
| 6,518,916 | B1* | 2/2003 | Ashihara | G01S 7/412 |
| | | | | 342/70 |
| 2004/0246167 | A1* | 12/2004 | Kumon | G01S 7/412 |
| | | | | 342/70 |
| 2005/0099332 | A1* | 5/2005 | Nakano | G01S 13/42 |
| | | | | 342/70 |
| 2008/0111733 | A1* | 5/2008 | Spyropulos | G01S 7/412 |
| | | | | 342/189 |
| 2009/0027180 | A1* | 1/2009 | Shibata | G01S 13/931 |
| | | | | 340/435 |
| 2011/0006941 | A1* | 1/2011 | Samukawa | G01S 13/931 |
| | | | | 342/70 |
| 2013/0002470 | A1* | 1/2013 | Kambe | G01S 13/867 |
| | | | | 342/55 |
| 2014/0292559 | A1* | 10/2014 | Asanuma | G01S 13/931 |
| | | | | 342/133 |
| 2015/0362592 | A1* | 12/2015 | Mizutani | G01S 13/04 |
| | | | | 342/118 |
| 2016/0003941 | A1* | 1/2016 | Satou | G01S 13/46 |
| | | | | 342/118 |
| 2018/0081052 | A1* | 3/2018 | Sakamaki | G01S 7/415 |
| 2018/0246187 | A1* | 8/2018 | Baba | G01S 7/415 |

FOREIGN PATENT DOCUMENTS

| | | |
|---|---|---|
| JP | 5908193 B1 | 4/2016 |
| JP | 2017-54311 A | 3/2017 |

* cited by examiner

RADAR SIGNAL PROCESSING DEVICE

BACKGROUND OF THE INVENTION

1. Field of the Invention

The present invention relates to a radar signal processing device of a vehicle-mounted radar device and, more particularly, relates to a technique for supporting a determination as to whether or not vehicle control should be performed by identifying an object as a predetermined category from a reflection wave in which a transmission wave from a radar is reflected by the object.

2. Description of the Related Art

Formerly, measurement results, such as a relative distance and a relative speed between one's own vehicle and a reflected object, a direction, and reflection intensity, which are measured by a vehicle-mounted radar device, are utilized for a vehicle-mounted application for improving vehicle's safeness and amenity. The vehicle-mounted application is, for example, a collision damage mitigation braking system that reduces damage at the time when one's own vehicle collides with an anterior obstacle and an adaptive cruise control system that follows an anterior vehicle.

In the application such as this, a determination is made as to whether or not one's own vehicle should be braked on the basis of the measurement results per se related to an object to be targeted or a new feature quantity derived from the measurement results.

For example, a target's height from the road surface is estimated from the power distribution of the target (a generation pattern of a null point due to multipath propagation) and a determination is made as to whether or not the target is a subject in which one's own vehicle should be braked.

Furthermore, the height of an object is estimated by checking an amplitude pattern dictionary (database) preliminarily created by the use of various sorts of objects whose heights are known.

As a different example, identification is performed as to whether or not a subject is a vehicle or a person to determine as to whether or not the subject is a braking subject on the basis of received power (radar reflection cross section) and a variation (standard deviation) of the difference between received power in an ascending section and a descending section of frequencies in a frequency modulated continuous wave (FMCW) system.

In the device which is for performing identification and estimation of the target, the object, and the like by the above-mentioned various types of techniques, estimation accuracy may be deteriorated when the measurement result cannot be normally obtained in the device in which the determination is performed on the basis of only the feature quantity; and in the system of checking the dictionary, a large number of data needs to be obtained for creating the dictionary which is for performing a highly accurate estimation and a certain level of data accumulation is required for calculating variations.

Furthermore, in Patent Document 1 which is a different device configured so as to be able to solve problems in these devices, a first feature quantity related to a relative distance and a relative speed to an object, the direction and the reflection intensity of the object is made identical in time series; a second feature quantity is extracted; and a category of the object is determined on the basis of an attribution degree to the distribution of the second feature quantity related to a predetermined category.

[Patent Document 1] JP,5908193,B

As a conventional device, there are those that use various kinds of techniques as described above; however, for example, in the device in Patent Document 1, when an object is a long distance away from one's own vehicle and/or when the object is very near one's own vehicle and is being gradually separated from a radar beam (a signal to noise power ratio is low), it is conceivable that received power of a radar reflection wave and change quantity of the received power to a distance change are changed not by inherent signal characteristics derived from the object, but by the influence of distance attenuation and noise, and the object is incorrectly identified as one that is not an actual attribute or the object is likely to be out of the identification.

SUMMARY OF THE INVENTION

The present invention has been made to solve the foregoing problem, and the object of the present invention is to obtain a radar signal processing device capable of identifying an object by the use of features of the object extracted from a radar measurement value and performing a highly accurate determination of a braking subject and a non-braking subject.

A radar signal processing device of the present invention includes: a first feature quantity extraction block which extracts information as a first feature quantity at a constant time cycle from a received signal of a radar, the information being related to at least a relative distance and a relative speed between each object about a plurality of objects and a vehicle, and the direction and the reflection intensity of the object; a data storage processing block which stores the first feature quantity and associates a plurality of the first feature quantities with the same object in time series over a plurality of cycles; a second feature quantity extraction block which extracts a second feature quantity from the first feature quantity in the data storage processing block; an attribution degree calculation block which calculates an attribution degree to the distribution of the second feature quantity related to a preliminarily defined category; an accumulation/instantaneous score calculation block which calculates a summation value as an instant score, the summation value being a summation of one in which the attribution degree of each second feature quantity is multiplied by a weight coefficient according to each second feature quantity, and calculates one in which the instantaneous score is accumulated in a cycle direction as an accumulation score; and an object determination block which determines a category of the object on the basis of the accumulation score calculated by the accumulation/instant score calculation block.

The radar signal processing device of the present invention performs an identification determination of the object by obtaining the accumulation score from the instant score based on the feature quantity of the object, whereby a kind identification can be made difficult to fail, out of identification hardly occurs, and the accuracy of the identification determination improves.

DETAILED DESCRIPTION OF THE INVENTION

Embodiment 1

Figure 1:
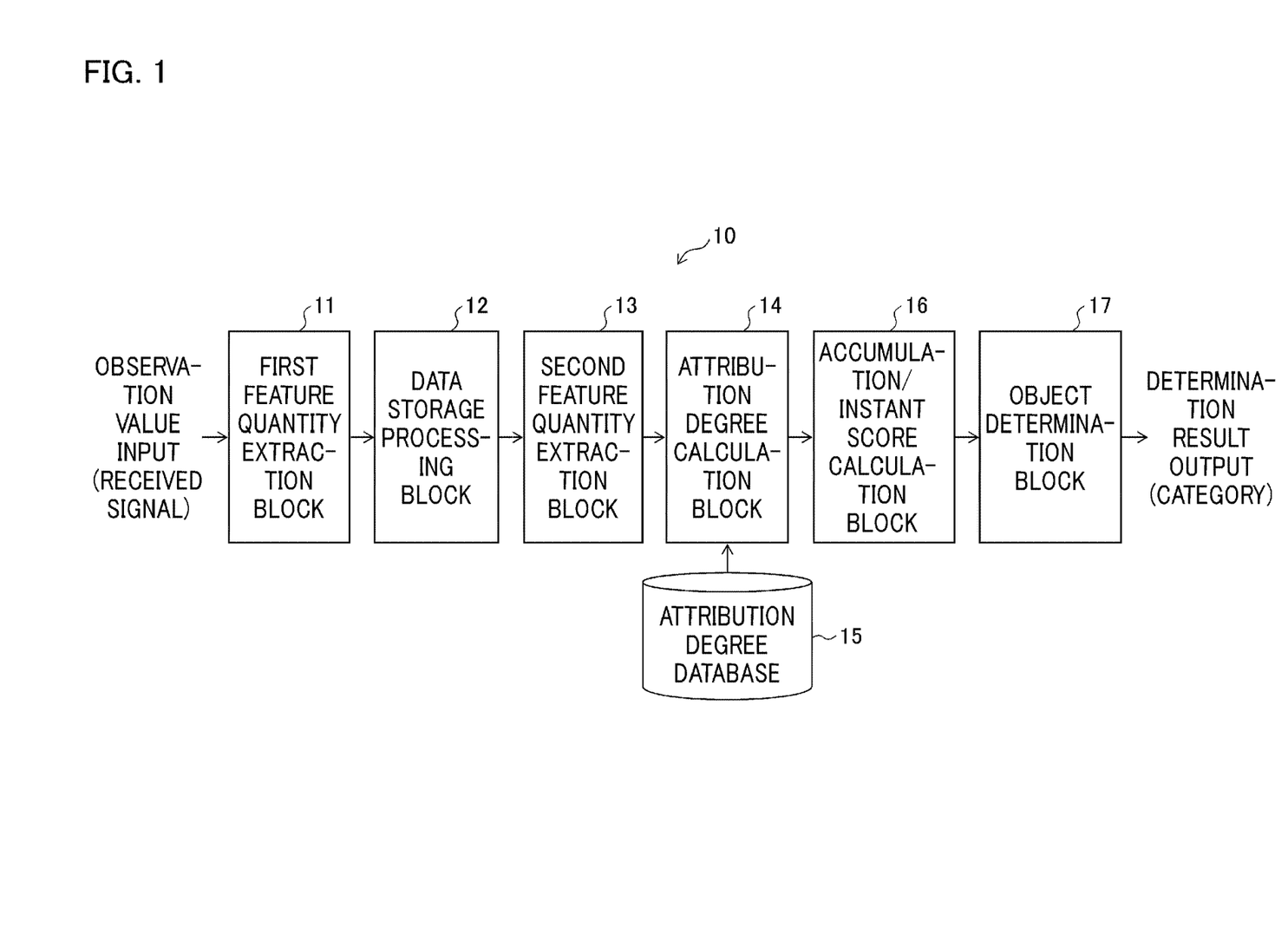
FIG. 1 is a configuration diagram showing a radar signal processing device according to Embodiment 1 of the present invention.

FIG. 1 is a configuration diagram showing a radar signal processing device of a vehicle-mounted radar device (also referred to as a "radar") according to Embodiment 1 of the present invention.

A radar signal processing device 10 shown in FIG. 1 includes: a first feature quantity extraction block 11, a data storage processing block 12, a second feature quantity extraction block 13, an attribution degree calculation block 14, an attribution degree database 15, an accumulation/instant score calculation block 16, and an object determination block 17.

Incidentally, a portion which radiates a radio wave to an object (not shown in the drawing) and receives a reflection wave from the object (also referred to as "reflected object") and a system thereof (FMCW system, frequency modulated interrupted continuous wave (FMICW) system, pulse Doppler system, and the like), a portion that performs the entire control, and the like are equivalent to a general vehicle-mounted radar; and therefore, their description will be omitted.

The first feature quantity extraction block 11 calculates at least a relative distance, a relative speed, a direction, and reflection intensity, which are related to the object, from a received signal obtained as an observation value input, that is, the reflection wave from the reflected object. Hereinafter, these are referred to as a first feature quantity. More specifically, the first feature quantity extraction block 11 extracts information as the first feature quantity at a constant time cycle from the received signal of the radar, the information being related to at least the relative distance and the relative speed between each object about the plurality of objects and one's own vehicle, and the direction and the reflection intensity of each object. In this regard, however, the first feature quantity not used in determination processing of a subsequent stage is not necessarily obtained. Incidentally, when there exists a plurality of the reflected objects, the first feature quantity related to the plurality of objects is calculated. Furthermore, the direction in the first feature quantity includes an output result by known super-resolution processing, such as estimation of signal parameters via rotational invariance techniques (ESPRIT) and multiple signal classification (MUSIC). Furthermore, the first feature quantity is one obtained at a predetermined cycle (for example, 100 msec).

The data storage processing block 12 stores the first feature quantity outputted from the first feature quantity extraction block 11 and gives, for example, the same identification data (ID) (number) to those related to the same reflected object about the stored first feature quantity. More specifically, the first feature quantity (relative distance, relative speed, direction, and received power) to which the same ID is given for each reflected object is stored in a time series in the data storage processing block 12. More specifically, the data storage processing block 12 associates a plurality of the first feature quantities with the same object in time series over a plurality of cycles. The first feature quantity is made identical in time series in the data storage processing block 12.

The second feature quantity extraction block 13 calculates a second feature quantity, such as a relative distance, a relative speed, a direction (wave number), received power (amplitude), a maximum detection distance, and a fluctuation of received power (distance/time) from the first feature quantity.

Incidentally, the received power can be such that a rapid change caused by noise, multipath propagation, and the like from reflection intensity obtained as the first feature quantity is suppressed.

Furthermore, the fluctuation of the received power can be set to the difference (or ratio) between the current observation value and its preceding observation value.

Additionally, information of the direction (wave number) information can be such that, for example, the number of reflected waves from the object is one wave or two waves (plurality) from a result of estimation of the wave number.

Moreover, in addition to those mentioned above, the second feature quantity can be other feature quantity obtained by the use of the first feature quantity; for example, a standard deviation, a maximum value, and the difference between the maximum value and the minimum value of the received power in a predetermined distance range or in a predetermined observation point can be added.

Incidentally, there can be added a feature quantity that directly shifts from the first feature quantity to the second feature quantity can be added, for example, the relative distance, the relative speed, and the like that can be directly used for determination, score calculation, or flag setting (as for the flag, it will be described later).

The attribution degree calculation block 14 calculates a value (attribution degree) of each category (kind) of each feature quantity of the second feature quantity inputted from the second feature quantity extraction block 13 on the basis of the distribution of attribution degree of each second feature quantity obtained from the attribution degree database 15. More specifically, the attribution degree calculation block 14 calculates the attribution degree to the distribution of the second feature quantity related to the preliminarily defined category.

The attribution degree database 15 quantifies and stores: the distribution of the second feature quantity obtained by preliminarily observing several examples about the preliminarily defined categories; the distribution of the second feature quantity based on theoretical values derived from transmission power, distance, antenna gain, reflection cross section, and the like; and properties based on experimental knowledge related to the categories.

Figure 2:
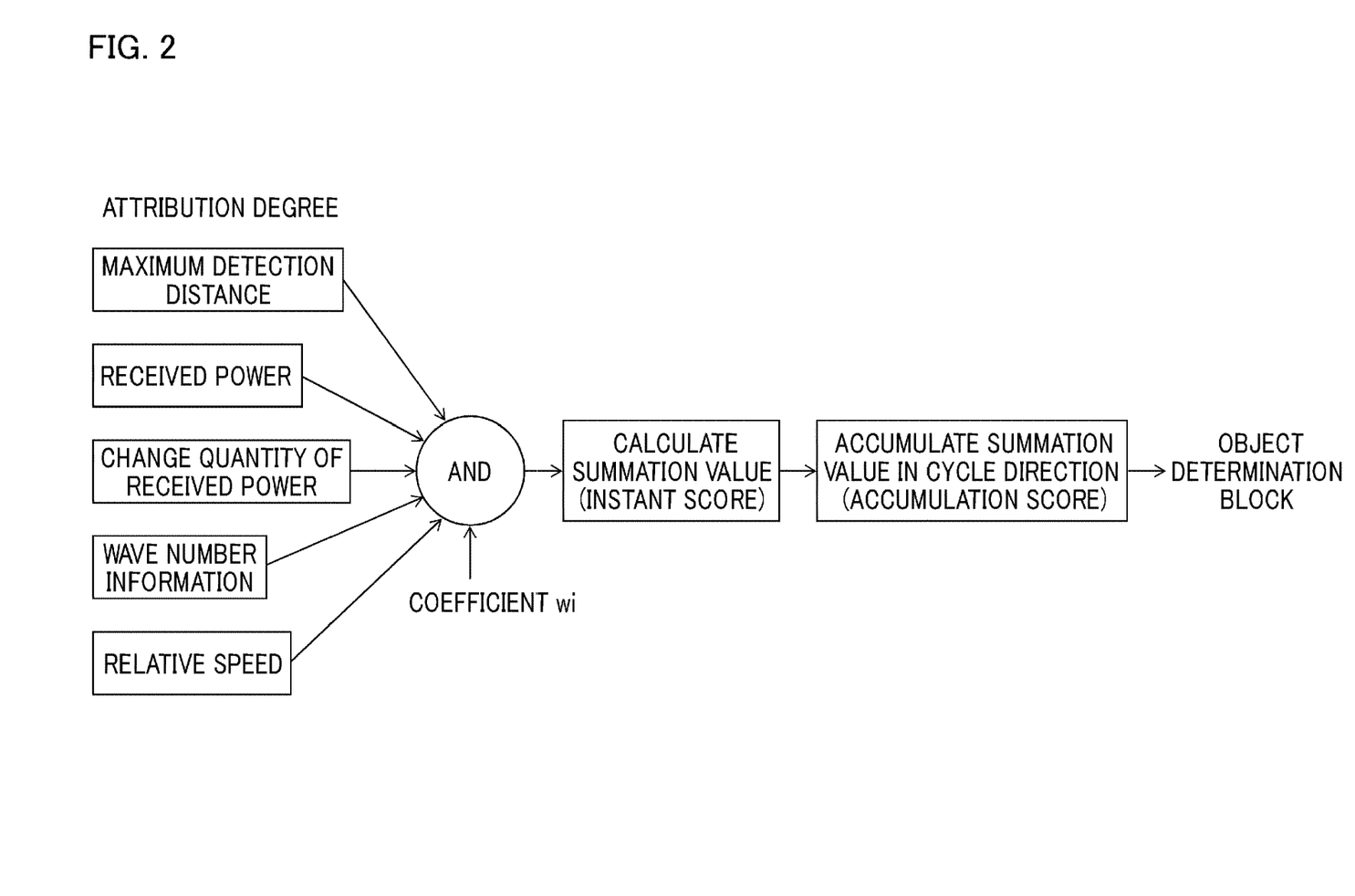
FIG. 2 is a conceptual view exemplarily showing the operation of an accumulation/instant score calculation block in the radar signal processing device according to Embodiment 1 of the present invention.

In the accumulation/instant score calculation block 16, like a conceptual view shown in FIG. 2, the attribution degree of the second feature quantity inputted from the attribution degree calculation block is multiplied by a predetermined weight coefficient according to the second feature quantity such as the maximum detection distance, received power, change quantity of the received power, wave number information, and relative speed, those of which represent the second feature quantity to calculate a summation value as an instant score; and one in which the summation value (instant score) is accumulated in a cycle direction is calculated as an accumulation score to output for object determination.

The object determination block 17 determines to which category the object belongs on the basis of the attribution degree of each category related to the object inputted from the accumulation/instant score calculation block 16, more specifically, determines a kind of the object (for example, vehicle, person, low position object having low height and capable of being overridden, and the like) and outputs a determination result.

Incidentally, after that, for example, the determination result is used for braking control by a control block (not shown in the drawing).

Next, operation will be described.

First, in the first feature quantity extraction block 11, the first feature quantity (relative distance, relative speed, direction, and reflection intensity) is calculated by the use of the received signal inputted for each predetermined observation cycle. Incidentally, since the first feature quantity is based on a general system in which the relative distance, the relative speed, the direction, and the reflection intensity are calculated in the radar, detailed description will be omitted.

Next, in the data storage processing block 12, the first feature quantity inputted from the first feature quantity extraction block 11 is stored; objects related to the same reflected object are made to correspond to each other by tracking processing using, for example, a Kalman filter together with the first feature quantity for a plurality of past observations stored until then; and the same ID (number) to the same reflected object and a time tag in which the update time of data is written or an order tag in which the input order of data is written are given. Incidentally, since the rapid change due to noise and multipath propagation is generally superimposed on the reflection intensity obtained as the first feature quantity, moving average by a predetermined distance range or a predetermined observation point is performed in order to obtain a stable determination result at a subsequent stage.

Incidentally, in the data storage processing block 12, for example, the first feature quantity in which a state where the first feature quantity of the same ID is not updated (added) reaches the number of predetermined observations is eliminated in series, whereby a memory space of the data storage processing block 12 can be saved.

Next, in the second feature quantity extraction block 13, the second feature quantity such as the maximum detection distance, the received power, the change quantity of the received power, and the wave number information is calculated by the use of the first feature quantity.

The maximum detection distance is a feature quantity that represents a maximum value of a relative distance of a target object. Generally, since an object having a certain height, such as a vehicle and a person is detected from a long distance, the maximum detection distance has a large tendency. On the other hand, since the low position object capable of being overridden is detected for the first time at a relatively short distance, the maximum detection distance has a small tendency.

The received power is a feature quantity that represents the reflection intensity of the object. Generally, an object having a high radar reflection cross section and material of metal etc., such as a vehicle, is high in reflection intensity at the same distance. On the other hand, since the person is smaller in the radar reflection cross section than the vehicle, the reflection intensity is smaller than the vehicle; however, since the person can take various postures, a range of value of the reflection intensity is large. Furthermore, for example, the low position object capable of being overridden, such as a joint of a road surface, grating, and the like is small in the received power at a relatively long distance; however, in the case of approaching, the influence of reflection from an edge portion becomes large and thus the received power has a relatively large value.

The change quantity of the received power is a feature quantity defined by the difference or the ratio between the received power at the current and the latest observation of the received power. Generally, in a situation approaching to an object (situation where a relative distance between one's own vehicle and the object becomes small), the change quantity of the received power transitions while keeping relatively small in the case of the vehicle except for rapid fluctuation of received power due to multipath propagation. Furthermore, in the case of the person, since the radar reflection cross section changes, the change quantity of the received power transitions more largely than the vehicle. Moreover, in the case of the low position object capable of being overridden, the change quantity of the received power transitions small at a long distance as in the vehicle and becomes large by the influence of edges and the like as approaching from a certain distance.

The wave number information is a feature quantity that represents the number of reflection points from the same object and the direction, which are obtained during angle measurement (super-resolution). For example, in the case of the vehicle, the number of the reflection points is one point or plural points according to a distance. Then, it becomes: a state where the number of the reflection points is clearly plural (when the reflection points have a predetermined direction difference); or a state where the number of the reflection points is not clear, but is plural (directions of the reflection points are near or one side thereof is out of angle measurement, or the like). Although it is true also in the case of the person and the low position object, such a state is anticipated to be different in the vehicle, the person, and the low position object. The wave number information expresses such each state by a number, for example, 1, 2, . . . .

Next, in the attribution degree calculation block 14, the attribution degree to each category (for example, vehicle, person, and low position object) of the extracted second feature quantity is calculated.

The preliminarily created attribution degree database 15 is used for calculating the attribution degree.

The attribution degree database 15 represents distribution conditions of the second feature quantity for each relative distance about a predetermined category. For example, as for the attribution degree in the case where the category is classified into a category 1 (low position object), a category 2 (person, pedestrian), and a category 3 (vehicle) in a certain relative distance of the second feature quantity, the attribution degree (vertical axis) over the entire feature quantity (horizontal axis) can be represented in a distributed shape. Furthermore, it can be expressed by a representative value (for example, value of the center of gravity, central value, and most frequent value) in a range of value of each category.

Incidentally, a method of creating the attribution degree database 15 is not limited to the above, but, for example, the entire range of value of each category can also be represented in a rectangular shape.

Furthermore, an overlap portion of each category can be such that a value divided by the number of overlaps is the distribution of the attribution degree of each category.

In the case where the attribution degree database 15 is created by the representative value, the area (memory) of database can be cut down.

The attribution degree database 15 can be created by obtaining several examples of sample (teacher data) of each category.

For example, in order to obtain the distribution of the attribution degree, creation can be performed by normalizing a maximum value after creating a histogram of the sample (teacher data). Furthermore, in the case where the distribution of the attribution degree is created for each relative distance, characteristics of each distance can also be finely reflected by setting the relative distance small (for example, 1 m) and therefore a highly accurate object identification can be achieved. Moreover, areas having similar characteristics in the second feature quantity are collected and the relative distance is largely set to be, for example, like far/near distance, whereby the areas (memory) of the database can also be cut down. Additionally, the distribution of the attribution degree can also be created for each relative speed. In this case, like the change quantity of the received power, it is anticipated that characteristics are different according to the relative speed in the feature quantity that captures a change of a plurality of observation points; however, it can be dealt with that by creating the distribution of the attribution degree for each speed and an effect of reducing deterioration of object identification performance can be expected.

In the accumulation/instant score calculation block 16, like the conceptual view shown in FIG. 2, the attribution degree of the second feature quantity inputted from the attribution degree calculation block is multiplied by the predetermined weight coefficient according to the second feature quantity such as the maximum detection distance, received power, change quantity of the received power, wave number information, and relative speed, those of which represent the second feature quantity to calculate the summation value as the instant score and one in which the summation value (instant score) is accumulated in the cycle direction is calculated as the accumulation score to output for object determination.

Incidentally, in FIG. 2, a coefficient Wi is the weight coefficient of each preliminarily defined second feature quantity.

The weight coefficient such as this can be set according to a degree of influence to the determination of each second feature quantity.

For example, when the degrees of influence of all the second feature quantities are equal, all the weight coefficients are set to the same value (for example, 1).

Furthermore, when the degree of influence of each secondary feature is different according to the relative distance, a more highly accurate processing can be achieved by changing the weight coefficient for each relative distance.

Figure 3:
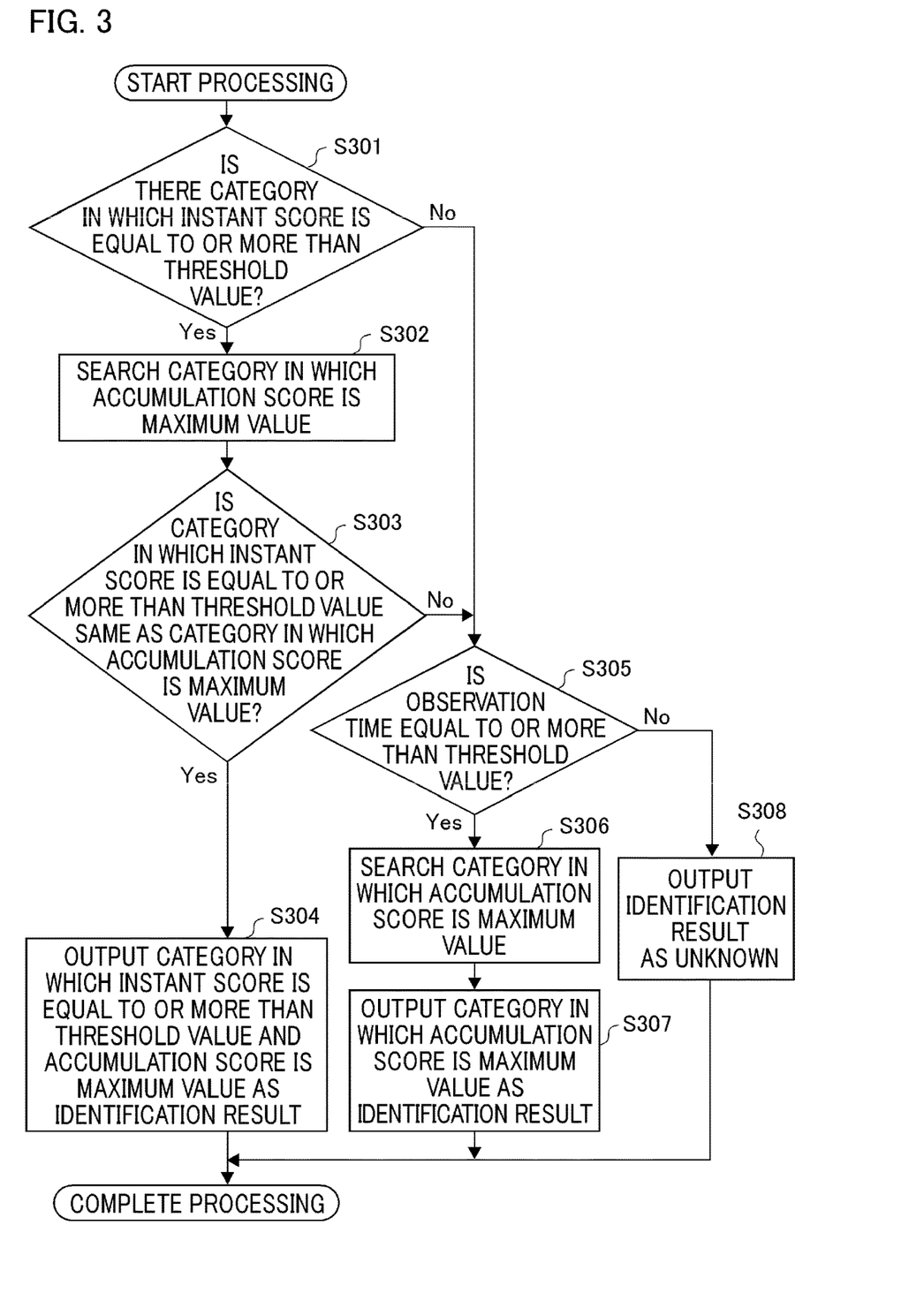
FIG. 3 is a flow chart for explaining the operation of an object determination block in the radar signal processing device according to Embodiment 1 of the present invention.

Next, the operation in the object determination block 17 will be described along a flowchart shown in FIG. 3.

First, after start processing, a determination is made as to whether or not there is a category in which the instant score is equal to or more than a threshold value (Step S301) on the basis of information from the accumulation/instant score calculation block 16; and when there is the category (Yes), a category in which the accumulation score is a maximum value is searched (Step S302). Next, a determination is made as to whether the category in which the instant score is equal to or more than the threshold value is the same as the category in which the accumulation score is the maximum value (Step S303); if determined as being the same category (Yes), the processing proceeds to Step S304; the category in which the instant score is equal to or more than the threshold value and the accumulation score is the maximum value is outputted as an identification result (Step S304); and the processing is completed. In the determination in Step S301, when there is not the category in which the instant score is equal to or more than the threshold value (No), the processing moves to Step S305. In Step S305, a determination is made as to whether or not observation time of the instant score is equal to or more than the threshold value; and if equal to or more than the threshold value (Yes), the category in which the accumulation score is the maximum value is searched (Step S306). Next, the category in which the accumulation score is the maximum value is outputted as an identification result (Step S307), and the processing is completed. Further, in the determination in Step S305, when the observation time is not equal to or more than the threshold value (No), the processing moves to Step S308. In Step S308, an identification result is outputted as unknown, and the processing is completed.

Furthermore, in the determination in Step S303, when the category in which the instant score is equal to or more than the threshold value is not the same as the category in which the accumulation score is the maximum value (that is, when both categories are different) (No), the processing moves to Step S305; and after that, the processing of the above described Step S305 to Step S308 are executed.

Incidentally, the threshold value of the observation time in Step S305 may be made valuable in one's own vehicle speed. For example, when one's own vehicle stops, the threshold value is made large; and when one's own vehicle moves (for example, equal to or more than 20 km/h), the threshold value is made small.

Next, description will be made on the relationship between the instant score and the accumulation score of the vehicle, the person, and the low position object.

Figure 4:
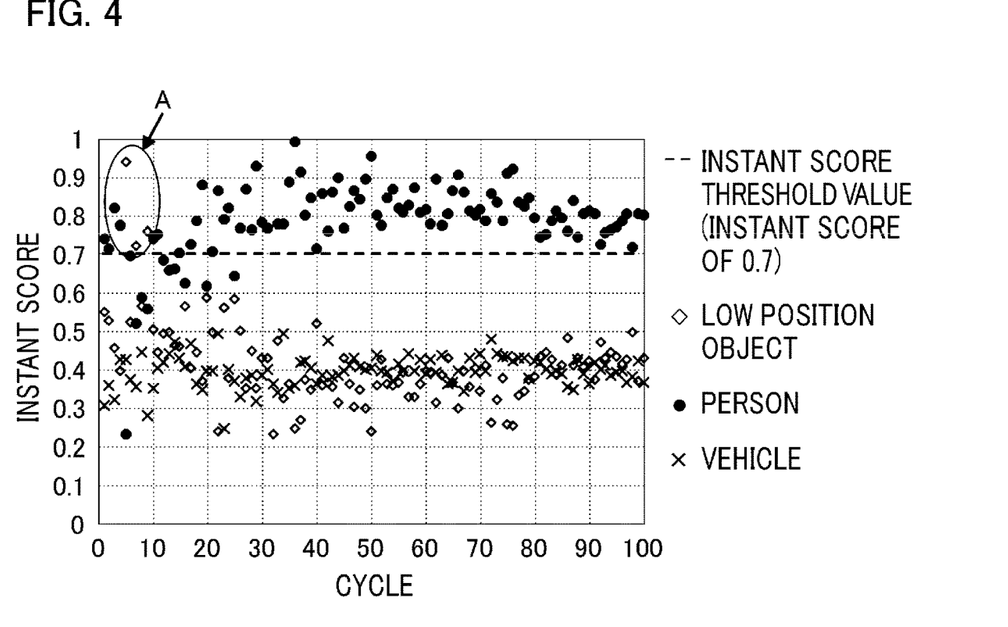
FIG. 4 is a characteristic view showing an example of an instant score obtained by the accumulation/instant score calculation block in the radar signal processing device according to Embodiment 1 of the present invention.
Figure 5:
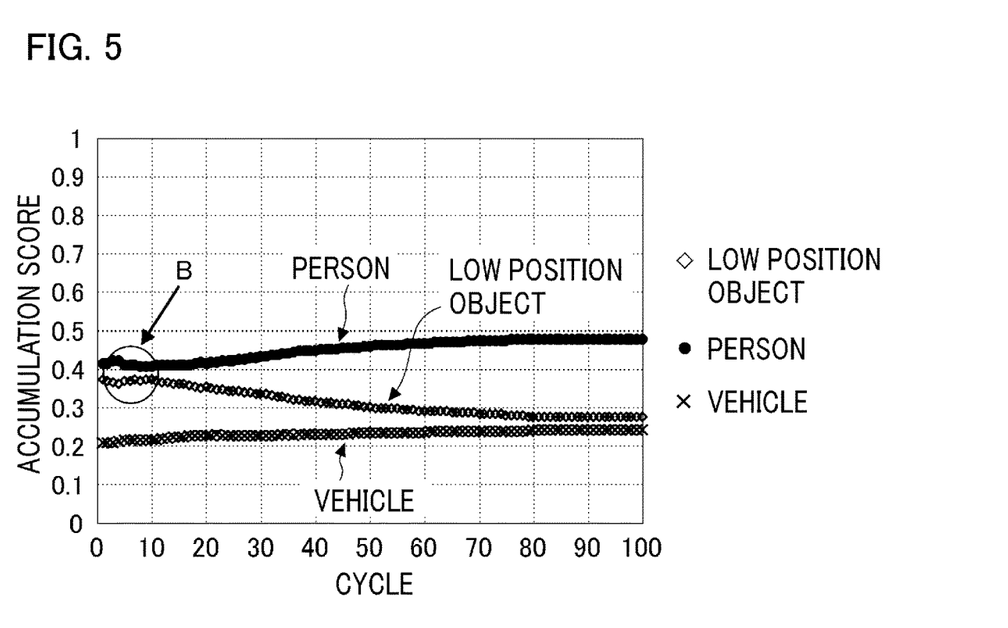
FIG. 5 is a characteristic view showing an example of an accumulation score obtained by the accumulation/instant score calculation block in the radar signal processing device according to Embodiment 1 of the present invention.

FIG. 4 and FIG. 5 show characteristics of the instant score and the accumulation score to cycles of the vehicle, the person, and the low position object in the case where the instant scores of two categories are equal to or more than the threshold value in a scene where the person approaches.

As shown in FIG. 4, when the threshold value of the instant score is an instant score of 0.7, the instant scores of the low position object and the person are equal to or more than the threshold value at an initial stage of the cycle as shown at an arrow portion A. Furthermore, as shown in FIG. 5, an output is made as an identification result in which the accumulation score of the person is a maximum category as shown at an arrow portion B and therefore the accumulation score can be identified as the person.

Figure 6:
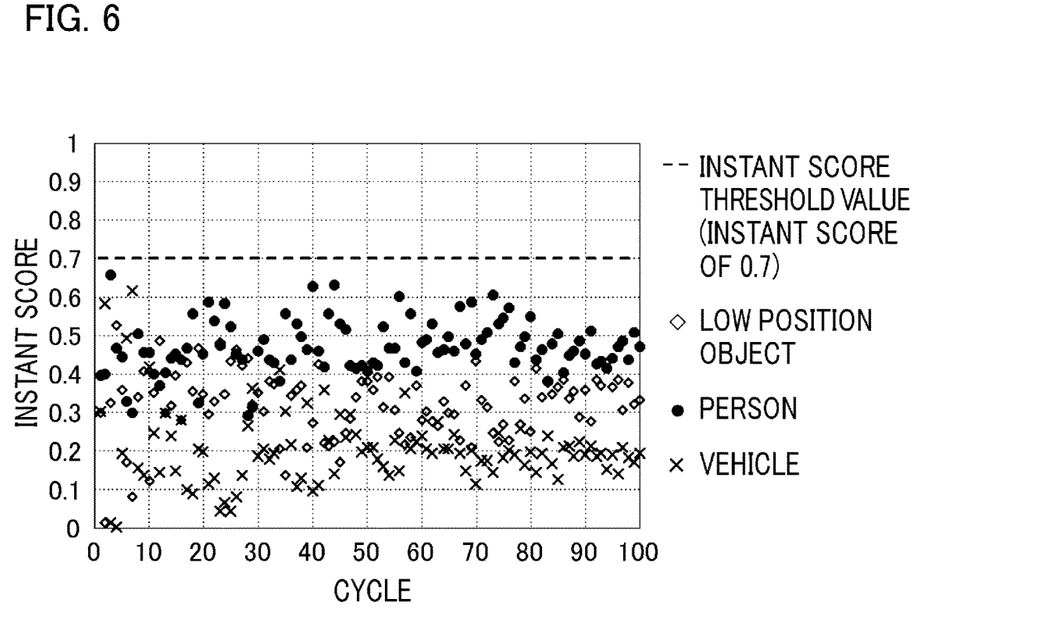
FIG. 6 is a characteristic view showing other example of the instant score obtained by the accumulation/instant score calculation block in the radar signal processing device according to Embodiment 1 of the present invention.
Figure 7:
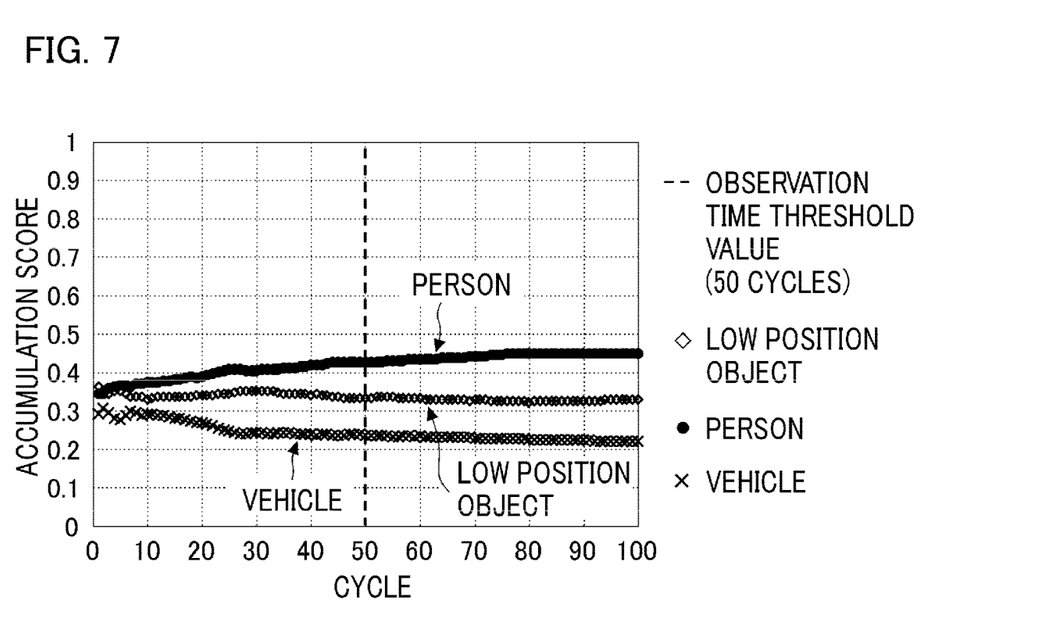
FIG. 7 is a characteristic view showing other example of the accumulation score obtained by the accumulation/instant score calculation block in the radar signal processing device according to Embodiment 1 of the present invention.

FIG. 6 and FIG. 7 show characteristics of the instant score and the accumulation score to the cycles of the vehicle, the person, and the low position object in the case where the instant scores of three categories are smaller than the threshold value in the scene where the person approaches.

As shown in FIG. 6, when the threshold value of the instant score is an instant score of 0.7, the instant score is not equal to or more than the threshold value also in any category. Furthermore, as shown in FIG. 7, an identification determination result is outputted as unknown in a first half portion of the cycle (cycle is 1 to less than 50) and a category in which the accumulation score is maximum is outputted as the identification result in a second half portion of the cycle (cycle is equal to or more than 50); and therefore it can be identified as the person.

Embodiment 2

Figure 8:
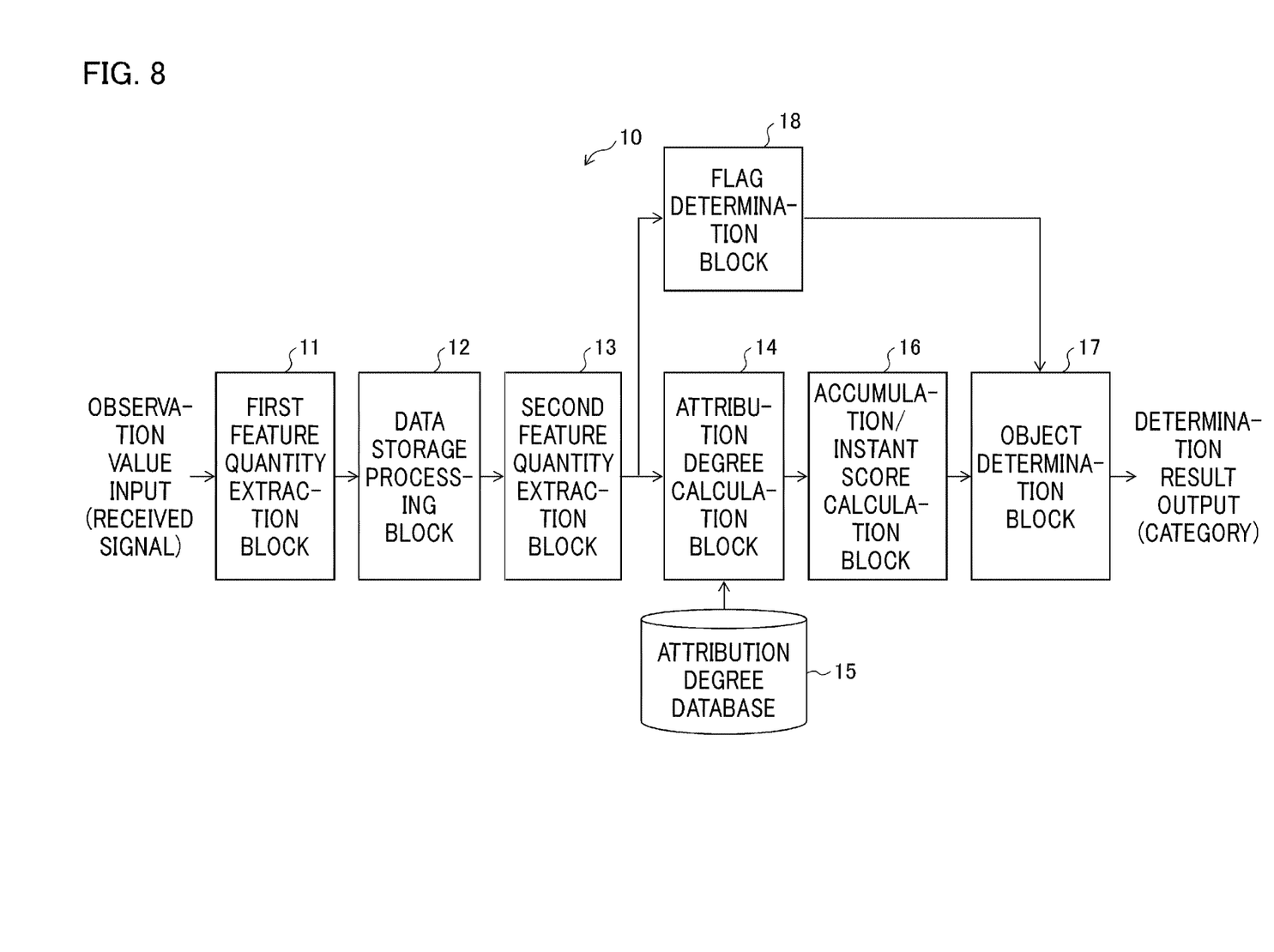
FIG. 8 is a configuration diagram showing a radar signal processing device according to Embodiment 2 of the present invention.

FIG. 8 is a configuration diagram showing a radar signal processing device of a vehicle-mounted radar device according to Embodiment 2 of the present invention. In the device in FIG. 8, a flag determination block is added to the device shown in FIG. 1. Incidentally, in FIG. 8, the same reference numerals as those shown in FIG. 1 represent identical elements.

The operation in a flag determination block 18 will be described along flowcharts shown in FIG. 9 and FIG. 10.

Figure 9:
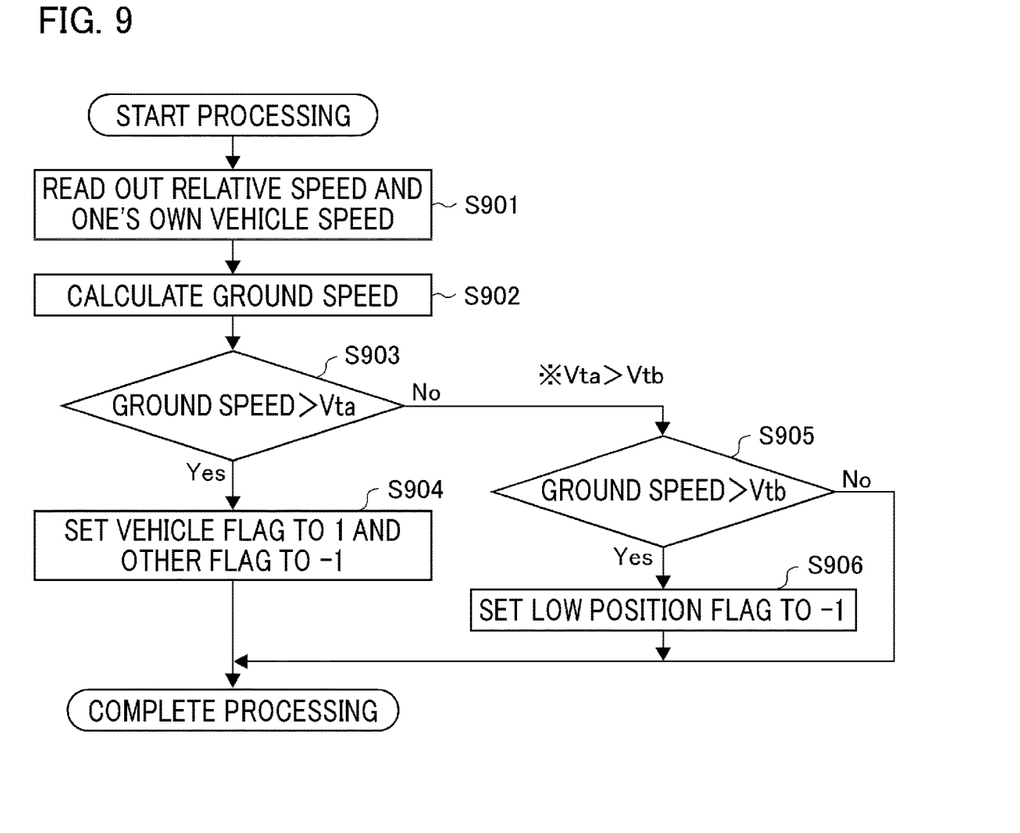
FIG. 9 is a flow chart for explaining the operation of a flag determination block in the radar signal processing device according to Embodiment 2 of the present invention.
Figure 10:
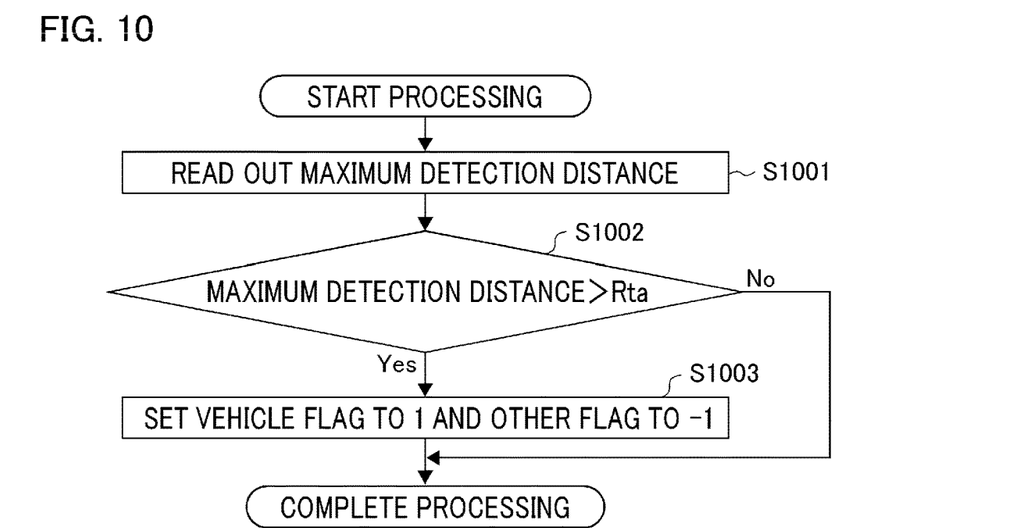
FIG. 10 is a different flow chart for explaining the operation of the flag determination block in the radar signal processing device according to Embodiment 2 of the present invention.

Incidentally, in FIG. 9 and FIG. 10, as a definition of a numerical value of a flag, "1" represents a status that is an object of a category of the flag; "−1" represents a status that is not an object of the category of the flag; and "0" represents an initial value. Furthermore, Vta represents a speed serving as a first threshold value; and Vtb represents a speed serving as a second threshold value. Vta is 20 km/h and Vtb is 5 km/h. Further, Rta represents a distance serving as a threshold value and Rta is 150 m. Incidentally, the speed Vtb is a speed slower than the speed Vta.

First, as shown in FIG. 9, after start processing, a relative speed and one's own vehicle speed are read out (Step S901); and in Step S902, a ground speed is calculated. Next, a determination is made as to whether or not the ground speed is larger than the speed Vta (Step S903); if the ground speed is larger than the speed Vta (Yes), a vehicle flag is set to the status "1" that is the category thereof and other flag is set to "−1" that is not the category thereof (Step S904); and the processing is completed. In the determination in Step S903, if the ground speed is not larger than the speed Vta (No), the processing moves to Step S905. In Step S905, a determination is made as to whether or not the ground speed is larger than the speed Vtb; if the ground speed is larger than the speed Vtb (Yes), a low position flag is set to "−1" (Step S906); and the processing is completed. Furthermore, in the determination in Step S905, if the ground speed is not larger than the speed Vtb (No), the processing is completed.

Furthermore, as shown in FIG. 10, a maximum detection distance is read out (Step S1001). Next, a determination is made as to whether or not the maximum detection distance is larger than the distance Rta (Step S1002); if the maximum detection distance is larger than the distance Rta (Yes), the vehicle flag is set to "1" and other flag is set to "−1" (Step S1003); and the processing is completed. In the determination in Step S1002, if the ground speed is not larger than the speed Vta (No), the processing is completed.

Figure 11A:
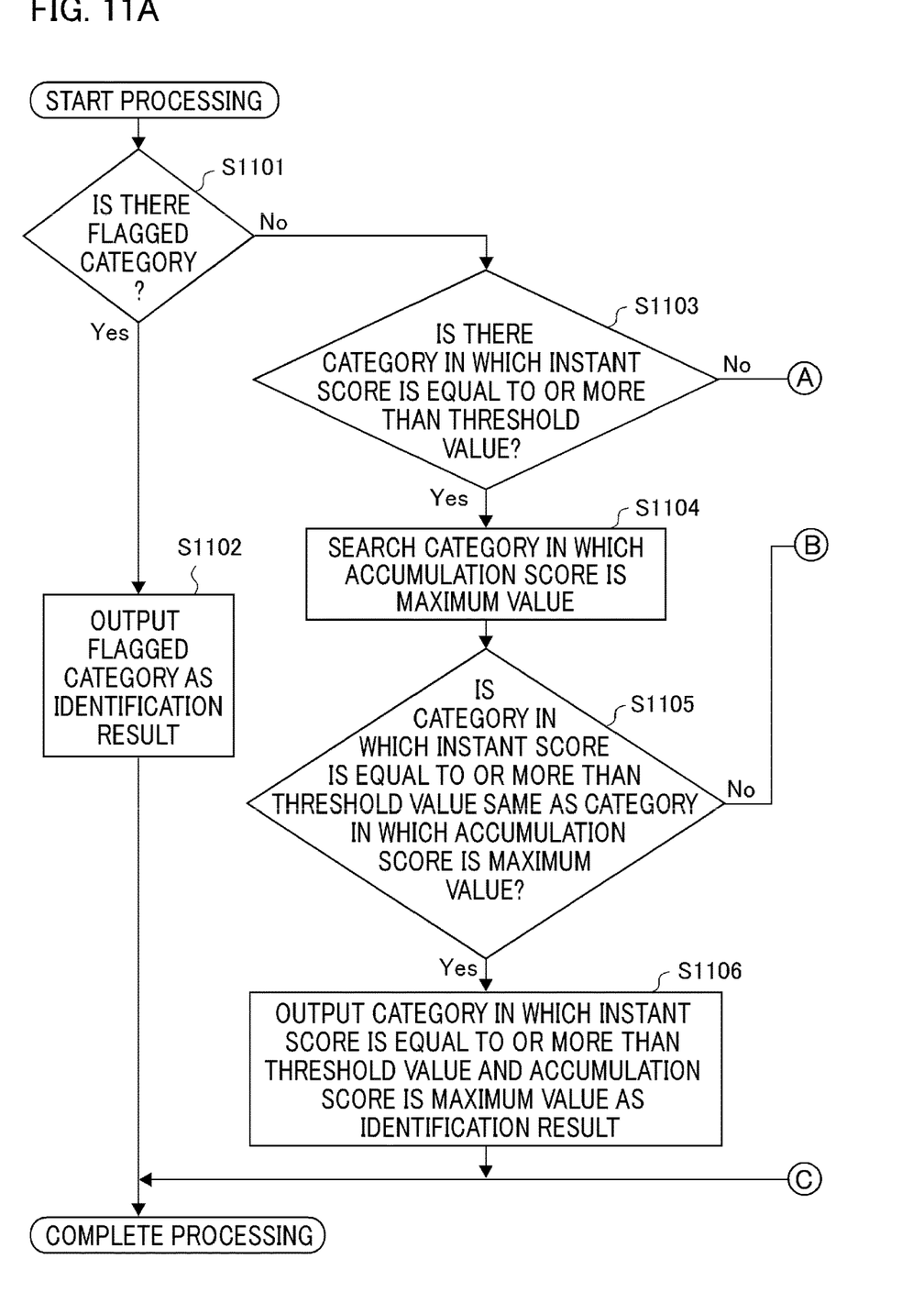
FIG. 11A is a flow chart for explaining the operation of an object determination block in the radar signal processing device according to Embodiment 2 of the present invention.
Figure 11B:
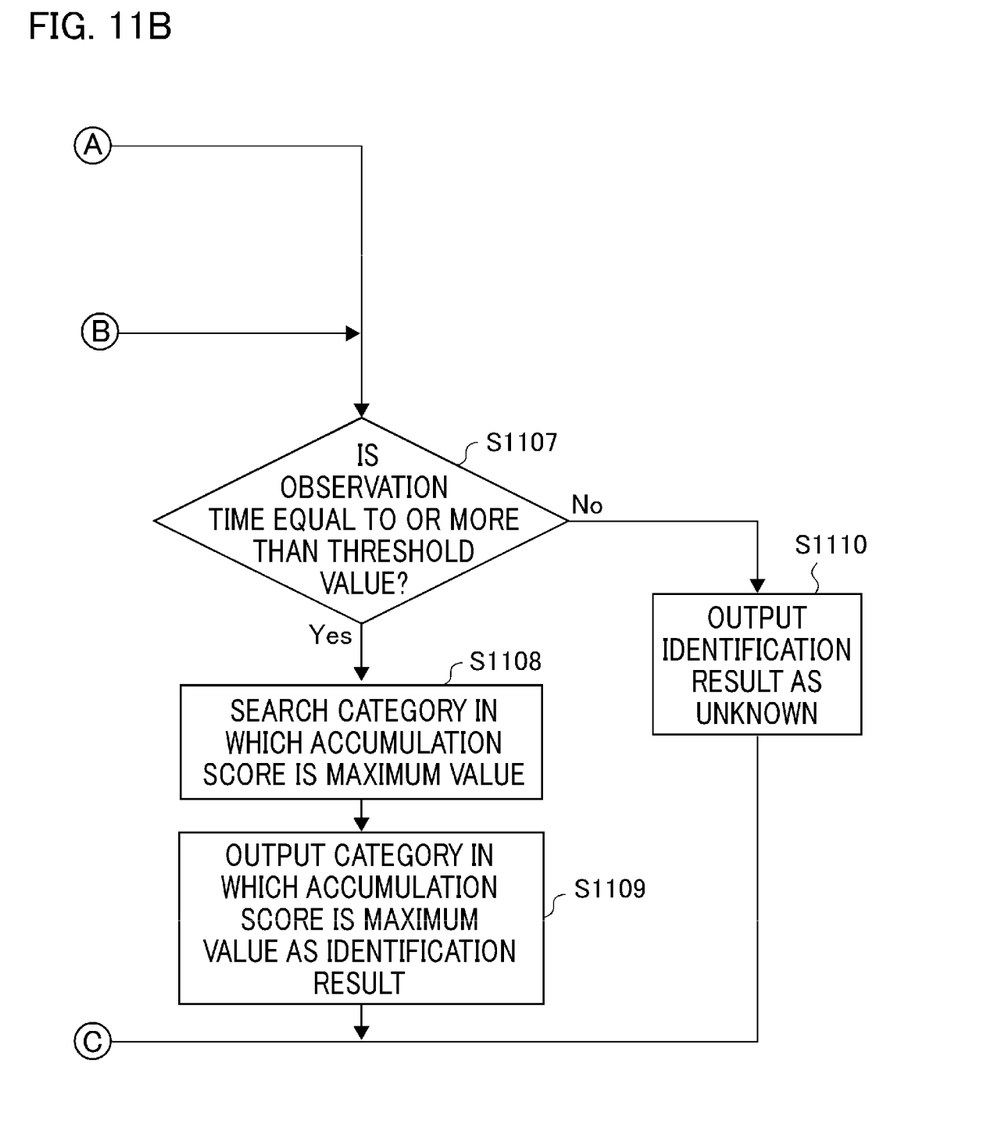
FIG. 11B is a flow chart for explaining the operation of the object determination block in the radar signal processing device according to Embodiment 2 of the present invention.

Next, the operation in an object determination block 17 will be described along flowcharts shown in FIG. 11A and FIG. 11B.

First, after start processing, a determination is made as to whether or not there is a flagged category on the basis of information from an accumulation/instant score calculation block 16 and the flag determination block 18 (Step S1101); when there is the category (Yes), the flagged category is outputted as an identification result (Step S1102); and the processing is completed. In the determination in Step S1101, when there is not the flagged category (No), the processing moves to Step S1103.

In Step S1103, a determination is made as to whether or not there is a category in which an instant score is equal to or more than the threshold value; and when there is the category (Yes), a category in which an accumulation score is a maximum value is searched (Step S1104). Next, a determination is made as to whether the category in which the instant score is equal to or more than the threshold value is the same as the category in which the accumulation score is the maximum value (Step S1105); if determined as being the same category (Yes), the processing proceeds to Step S1106; the category in which the instant score is equal to or more than the threshold value and the accumulation score is the maximum value is outputted as an identification result (Step S1106); and the processing is completed. In the determination in Step S1103, when there is not the category in which the instant score is equal to or more than the threshold value (No), the processing moves to Step S1107. In Step S1107, a determination is made as to whether or not observation time is equal to or more than the threshold value; and if equal to or more than the threshold value (Yes), the category in which the accumulation score is the maximum value is searched (Step S1108). Next, the category in which the accumulation score is the maximum value is outputted as an identification result (Step S1109) and the processing is completed. Further, in the determination in Step S1107, when the observation time is not equal to or more than the threshold value (No), the processing moves to Step S1110. In Step S1110, the identification result is outputted as unknown and the processing is completed.

Furthermore, in the determination in Step S1105, when the category in which the instant score is equal to or more than the threshold value is not the same as the category in which the accumulation score is the maximum value (that is, when both categories are different) (No), the processing moves to Step S1107; and after that, the processing of the above described Step S1107 to Step S1110 is executed.

Incidentally, the threshold value of the observation time in Step S1107 may be made valuable in one's own vehicle speed. For example, when one's own vehicle stops, the threshold value is made large; and when one's own vehicle moves (for example, equal to or more than a speed of 20 km/h), the threshold value is made small.

In the above described respective embodiments, it is conceivable that the distribution of the attribution degree is created for each mounting position of one's own vehicle's radar.

As described above, a radar reflection wave is different in characteristics such as the presence or absence of the occurrence of multipath propagation by the height of the object and the mounting position (height) of one's own vehicle's radar.

Thus, when the mounting position of one's own vehicle's radar is changed by vehicle types and other conditions, a more accurate determination can be performed than using the distribution of attribution degree (database) specialized to its mounting position.

More specifically, the distribution of the attribution degree is created/changed for each mounting position of one's own vehicle's radar, whereby a more highly accurate object identification can be performed.

Figure 12:
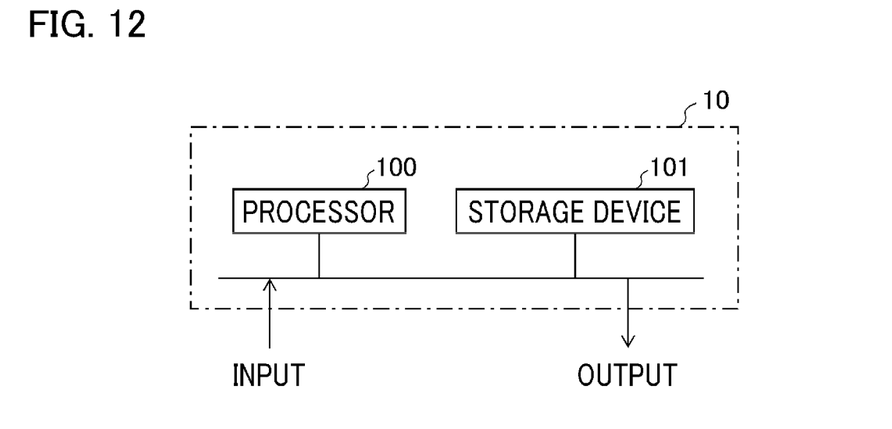
FIG. 12 is a block diagram showing an example of hardware in the radar signal processing device according to each embodiment of the present invention.

Incidentally, the radar signal processing device 10 is composed of a processor 100 and a storage device 101 as shown in FIG. 12 of an example of hardware. Although the storage device is not shown in the drawing, a volatile storage device such as a random access memory and a non-volatile auxiliary storage device such as a flash memory are provided. Furthermore, an auxiliary storage device of a hard disk may be provided in place of the flash memory. The processor 100 executes a program inputted from the storage device 101. In this case, the program is inputted from the auxiliary storage device to the processor 100 via the volatile storage device. Furthermore, the processor 100 may output data such as a result of calculation to the volatile storage device of the storage device 101 or the data may be stored in the auxiliary storage device via the volatile storage device.

The embodiments of the present invention can freely combine the respective embodiments and can appropriately change and/or omit the respective embodiments.

What is claimed is:

1. A radar signal processing device of a radar, which is mounted on a vehicle and outputs information related to a plurality of objects, the radar signal processing device comprising:
   a first feature quantity extractor which extracts information as first feature quantities at a constant time cycle from received signals of the radar, the information being related to a relative distance and a relative speed between each object of the plurality of objects and the vehicle, and a direction and a reflection intensity of each object;
   a data storage which stores the first feature quantities in association with the same object in time series over a plurality of cycles;
   a second feature quantity extractor which extracts second feature quantities including received power of each distance and a change in the received power from the first feature quantities in the data storage;
   an attribution degree calculator which calculates an attribution degree to a distribution of the second feature quantities related to a plurality of categories including a preliminarily defined vehicle, pedestrian, and low position object for each second feature quantity;
   an accumulation/instantaneous score calculator which calculates an instant score by summing the attribution degree of each second feature quantity that is multiplied by a weight coefficient according to each second feature quantity, and calculates an accumulation score by accumulating the instantaneous score over time in a cycle direction for each of the plurality of categories; and
   an object determiner which determines a category of the object based on the accumulation score, among the plurality of categories calculated,
   wherein the first feature quantity extractor, the second feature quantity extractor, the attribution degree calculator, the accumulation/instantaneous score calculator, and the object determiner are included in one or more processors of the radar signal processing device.

2. The radar signal processing device according to claim 1,
   wherein the object determiner performs an identification determination of the object by the accumulation score if the instant score is equal to or more than a threshold value.

3. The radar signal processing device according to claim 1,
   wherein the object determiner performs an identification determination of the object by the accumulation score regardless of the instant score if observation time of the instant score is equal to or more than a threshold value.

4. The radar signal processing device according to claim 1,
   wherein the one or more processors further comprise a flag determiner in which, based on the second feature quantities extracted by the second feature quantity extractor, a vehicle flag is set to a status that is a category thereof and a flag of other category is set to a status that is not the category thereof if ground speed of the object is equal to or more than a first threshold value, a low position flag is set to a status which is not the low position object if the ground speed of the object is equal to or more than a second threshold value slower than the first threshold value and is slower than the first threshold value, and the vehicle flag is set to a status that is the category thereof and other category is set to a status that is not the category thereof if a maximum detection distance of the object is equal to or more than a threshold value; and
   wherein the object determiner performs an identification determination of the object on the basis of a result obtained by the flag determiner.

5. The radar signal processing device according to claim 1,
   wherein the object determiner
      identifies at least one category in which the instant score is greater than or equal to a threshold value, among the plurality of categories,
      identifies a category in which the accumulation score has a maximum value, among the plurality of categories;
      in response to the category in which the accumulation score has the maximum value matching one of the at least one category in which the instant score is greater than or equal to the threshold value, outputs, as an identification result, the category in which the accumulation score has the maximum and in which the instant score is greater than or equal to the threshold value.

* * * * *

UNITED STATES PATENT AND TRADEMARK OFFICE
CERTIFICATE OF CORRECTION

PATENT NO.        : 10,866,309 B2
APPLICATION NO.   : 15/964350
DATED             : December 15, 2020
INVENTOR(S)       : Mitsuru Kirita and Hiroshi Sakamaki It is certified that error appears in the above-identified patent and that said Letters Patent is hereby corrected as shown below:

In the Claims

In Claim 1, Column 12, Line 8, after "categories", delete "calculated"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*